H. A. ROBERTSON.
HOSE COUPLING.
APPLICATION FILED MAR. 15, 1915.
1,178,348.
Patented Apr. 4, 1916.
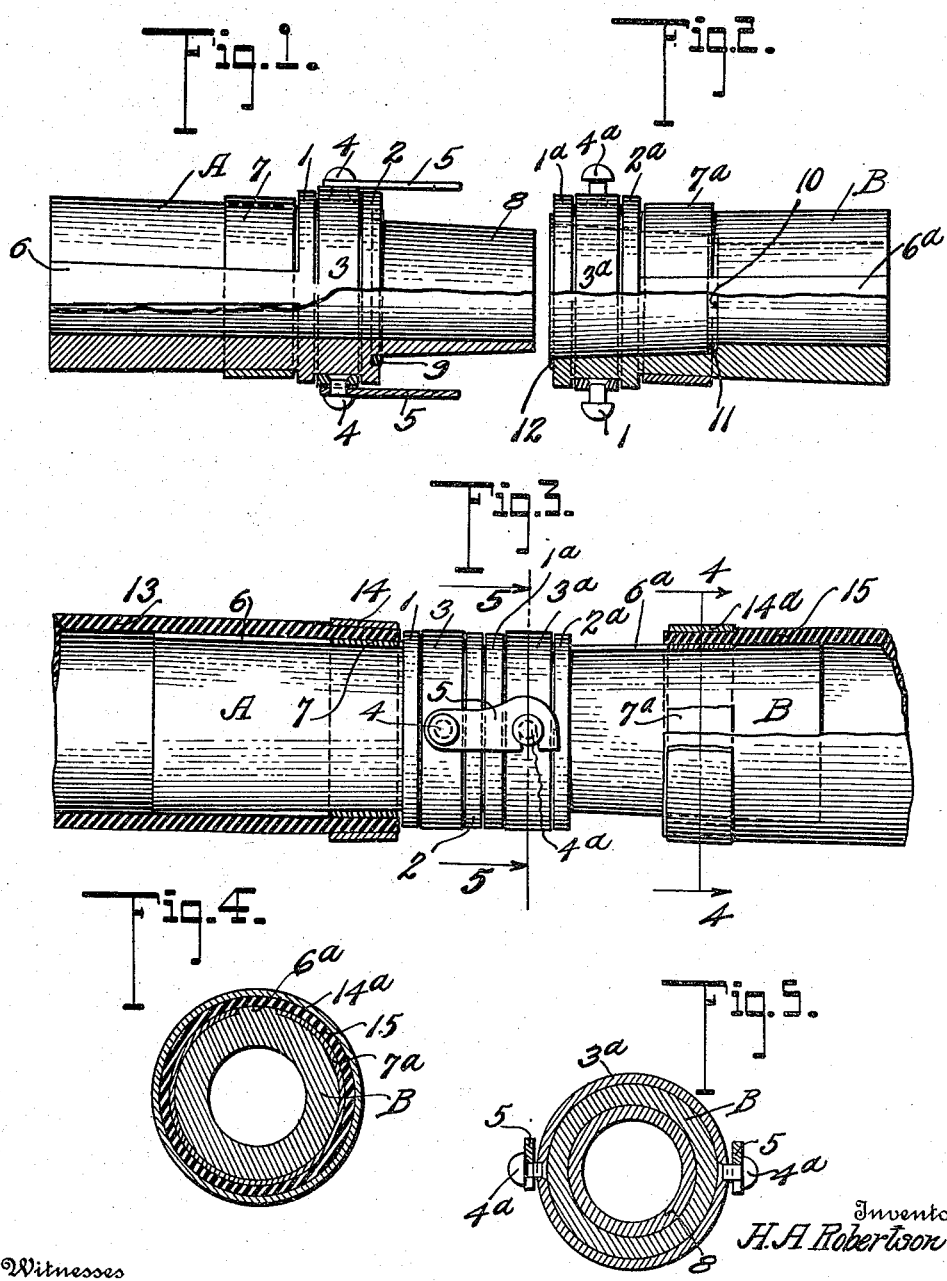

UNITED STATES PATENT OFFICE.

HARVEY A. ROBERTSON, OF AMBRIDGE, PENNSYLVANIA.

HOSE-COUPLING.

1,178,348. Specification of Letters Patent. Patented Apr. 4, 1916.

Application filed March 15, 1915. Serial No. 14,491.

*To all whom it may concern:*

Be it known that I, HARVEY A. ROBERTSON, a citizen of the United States, residing at Ambridge, in the county of Beaver and State of Pennsylvania, have invented certain new and useful Improvements in Hose-Couplings, of which the following is a specification.

The present invention relates to improvements in hose couplings, having as its primary object the provision of coacting coupling members by means of which sections of hose may be effectively connected, said coupling members carrying hose engaging members so arranged on the aforesaid elements as to more securely clamp the hose sections on the coupling members, the greater the strain tending to pull said sections apart.

More specifically, the invention consists in a male and a female coupling member adapted to be inserted into the respective contiguous hose extremities, said members having movably mounted thereupon expansible bands engaging the interior of the hose ends, the coupling members being formed with wedge expanding means coöperating with the bands whereby on application of stress to the hose sections tending to separate the same from said members the bands are expanded and more firmly hold the hose upon the respective coupling members, locking means being provided for connecting the coupling members together.

With the above and other objects in view, this invention consists in the construction, combination and arrangement of parts all as hereinafter more fully described and claimed.

Reference will now be had to the accompanying drawing forming a part of this specification, wherein:

Figure 1 is a plan view, partly broken away and shown in section of the male element of my coupling invention. Fig. 2 is a similar view and showing the female element of the device. Fig. 3 is a longitudinal sectional view through the coupling improvements and taken upon a plane at right angles to the views of Figs. 1 and 2. Figs. 4 and 5 are transverse, sectional views taken on the respective lines 4—4 and 5—5 of Fig. 3.

Throughout the following detail description, and on the several figures of the drawing, similar parts are referred to by like reference characters.

Specifically describing my improvements, the character A designates the male member of my hose coupling and B the female member. Each of these members consists of a tubular body of suitable size and material for performing the function of connecting together hose sections in a manner most clearly disclosed by Fig. 3 of the drawing. The body A is provided intermediate its length with spaced annular flanges 1 and 2 between which is rotatably mounted a collar or ring 3. This collar is provided with diametrically opposite headed studs 4 pivotally connected to which are coupling hooks or links 5. Extending longitudinally of the member A and projecting from its body, starting at the flange 1 is a wedge shaped projection 6, the larger end of which projection is at the left-hand extremity as shown in Fig. 1 of the drawing. Slidably mounted upon the coupling member A, at one side of the flange 1, is disposed a split band 7, the ends of which abut against the sides of the wedge shaped projection 6 hereinbefore mentioned. It will be noted by reference to Fig. 1 that the coupling member A is formed with a reduced nipple 8 at one end adjacent the base of which, and substantially interiorly of the flange 2 the member is suitably grooved to receive a gasket 9.

Passing now to the coacting coupling element B said element conforms in essential respects to the member A in that it is formed with spaced annular flanges 1$^a$ and 2$^a$ between which is rotatably mounted a collar 3$^a$ provided with diametrically opposite headed studs 4$^a$ over which the connecting links or hooks 5 of the member A are adapted to be engaged. This member B is furthermore provided with a slidable expanding band 7$^a$ coacting with a wedge shaped projection 6$^a$ of similar conformation to the equivalent element on the member A. Interiorly the coupling member B is pocketed to receive the reduced nipple 8 of the coupling member A, and is formed with a shoulder 10, against which is seated a gasket 11 and in the connection of these coupling members it will be apparent that the extremity of the reduced nipple 8 seats against this gasket on the one end while the annular shoulder 12 at the end of the member B will seat against the gasket 9 on the coupling member A forming a watertight joint as will be apparent to those skilled in the art to which this invention relates.

In the use of my coupling means, it will be understood that the hose section 13 is inserted over the coupling member A when the band 7 is disposed adjacent to the flange 1 where it is in its maximum contracted condition, said hose section extending on to the said band. Obviously to cause a positive engagement of the hose, with the interior wall extremity of the hose, a slight movement of said section in a direction drawing the same off of the coupling member will cause the band 7 to expand, by reason of its coaction with the wedge shaped projection 6. To make more positive the engagement just mentioned, I preferably though not necessarily so, employ an exterior band or ring 14 of a sufficient size to surround the outer end of the hose section 13. This will prevent mutilation or bursting of the hose section due to the expanding action of the interior band 7, in addition to the fact that it will more positively clamp the hose extremity between the two bands. The hose section 15 is in a like manner engaged with the coupling member B and Fig. 3 most clearly shows the action of the expansion means of this device when said section is moved in a direction tending to withdraw the hose section from said coupling member. This action represents what takes place when any stress is applied to the hose in its use and it will be apparent that the accidental disconnection of the hose sections from the coupling members is extremely unlikely, if at all possible, depending, of course, upon the strength of the exterior ring members, it being understood that an outer ring 14ª is employed to coact with the end of the hose section 15 as described with respect to the other hose section. Thus to connect the two coupling members together, the hooks or links 5 are engaged over the studs 4ª and the opening of the hooks is purposely formed at an incline so as to cause a tightening action against the gaskets 9 and 11 as the hooks are moved into an engaged position.

Having thus described my invention, what I claim as new is:

1. In a hose coupling, the combination of a pair of coupling members each adapted to receive the end portion of a hose section, a hose engaging member movably mounted upon each coupling member, and expansion means on the coupling members coöperating with the hose engaging elements whereby to cause the latter to engage the hose section when stress tending to separate said sections is applied.

2. In a hose coupling, the combination of a pair of coupling members, a hose engaging band slidably mounted on each coupling member, means on said coupling members with which the bands coact and adapted upon movement of the hose in one direction to expand the bands and upon movement in the other direction to allow contraction of said bands for engaging and disengaging actions with respect to the hose.

3. A hose coupling comprising a tubular body, a wedging projection extending therefrom, and a hose engaging member surrounding the body and slidably coacting with the projection for expansion and contraction upon sliding movements.

4. A hose coupling comprising a tubular body, a wedging projection formed thereon and extending longitudinally of the body, a split band surrounding the body and having its ends coacting with the lateral portions of the projection, said band being expansible to engage the hose section, adapted to be inserted thereover, when moved in one direction.

5. A hose coupling comprising a tubular body, a wedging projection formed thereon and extending longitudinally of the body, a split band surrounding the body and having its ends coacting with the lateral portions of the projection, said band being expansible to engage the hose section and adapted to be inserted thereover when moved in one direction, and an exterior band disposed on the hose for coöperation with the inner band whereby to clamp the hose therebetween upon movement of said bands in one direction.

In testimony whereof I affix my signature in presence of two witnesses.

HARVEY A. ROBERTSON.

Witnesses:
C. ROY KERR,
W. S. DICKSON.